US011194493B2

(12) United States Patent
Kao

(10) Patent No.: US 11,194,493 B2
(45) Date of Patent: Dec. 7, 2021

(54) DATA STORAGE SYSTEM CAPABLE OF USING HIGH SPEED CHANNEL TO ACCESS DATA, AND USING LOW SPEED CHANNEL TO MANAGE DATA EXCHANGING, COPYING, AND MOVING

(71) Applicant: INNODISK CORPORATION, New Taipei (TW)

(72) Inventor: Chih-Chieh Kao, New Taipei (TW)

(73) Assignee: Innodisk Corporation, New Taipei (TW)

(*) Notice: Subject to any disclaimer, the term of this patent is extended or adjusted under 35 U.S.C. 154(b) by 106 days.

(21) Appl. No.: 16/682,352

(22) Filed: Nov. 13, 2019

(65) Prior Publication Data
US 2021/0064240 A1 Mar. 4, 2021

(30) Foreign Application Priority Data
Sep. 3, 2019 (TW) ................. 108131756

(51) Int. Cl.
G06F 3/06 (2006.01)
G06F 13/16 (2006.01)

(52) U.S. Cl.
CPC ............ G06F 3/064 (2013.01); G06F 3/0613 (2013.01); G06F 3/0647 (2013.01); G06F 3/0658 (2013.01); G06F 3/0659 (2013.01); G06F 3/0683 (2013.01); G06F 13/1668 (2013.01)

(58) Field of Classification Search
CPC ...... G06F 3/064; G06F 3/0613; G06F 3/0647; G06F 13/1668; G06F 3/0659; G06F 3/0683; G06F 3/0658; G06F 3/061; G06F 3/0689

USPC .......... 711/154, 161, 4, 165, 5, 103; 710/29, 710/126, 116; 707/693, 813; 714/773
See application file for complete search history.

(56) References Cited

U.S. PATENT DOCUMENTS

| 2002/0023190 | A1* | 2/2002 | Peng | G06F 13/1626 710/308 |
| 2005/0060480 | A1* | 3/2005 | Solomon | G06F 13/4221 710/306 |
| 2017/0040057 | A1* | 2/2017 | Cho | G06F 13/16 |
| 2017/0357609 | A1* | 12/2017 | Long | G06F 13/385 |
| 2018/0060267 | A1* | 3/2018 | Sutton | G06F 13/4208 |
| 2018/0090185 | A1* | 3/2018 | Hossain | G11C 8/18 |
| 2021/0056055 | A1* | 2/2021 | Hamilton | G06F 13/36 |

* cited by examiner

Primary Examiner — Hong C Kim
(74) Attorney, Agent, or Firm — Rosenberg, Klein & Lee

(57) ABSTRACT

The invention provides a data storage system having dual channels, which comprises a host. The host comprises a host-side control unit, a first data storage device, and at least one second data storage device. The first data storage device comprises a first data-side controller. The host-side control unit is connected to the first data storage device via a high-speed channel, and accesses data of the first data storage device via the high-speed channel. The first data storage device is connected to each of the second data storage devices via a low-speed channel, respectively. The low-speed channel is a bus of broadcast type. The first data-side controller of the first data storage device manages data exchanging, data copying, and data moving between the first data storage device and the second data storage device via the low-speed channel.

16 Claims, 6 Drawing Sheets

DATA STORAGE SYSTEM CAPABLE OF USING HIGH SPEED CHANNEL TO ACCESS DATA, AND USING LOW SPEED CHANNEL TO MANAGE DATA EXCHANGING, COPYING, AND MOVING

This non-provisional application claims priority claim under 35 U.S.C. § 119(a) on Taiwan Patent Application No. 108131756 filed Sep. 3, 2019, the entire contents of which are incorporated herein by reference.

FIELD OF THE INVENTION

The present invention relates to a data storage system, more particularly, a data storage system having a high-speed channel and a low-speed channel.

BACKGROUND

Referring to FIG. 1, there is shown an architecture diagram of a data storage system in prior art. As shown FIG. 1, the data storage system 100 comprises a host 10. The host 10 comprises a motherboard 11. The motherboard 11 is provided with a host-side control unit 111, which is central processing unit (CPU), SATA controller, or PCIe controller. The host 10 is usually provided with a plurality of data storage devices 13 in order to the requirement for storing data. The host-side control unit 111 is connected to each of the data storage devices 13 via a high-speed channel 12, and accesses data for each of the data storage devices 13 via the high-speed channel 12, respectively. The high-speed channel 12 is a SATA bus or a PCIe bus.

The high-speed channel 12 is a relatively expensive electronic component. The host 10 is provided with the plurality of high-speed channels 12 therein, which will increase a lot of hardware cost. Furthermore, the host-side control unit 111 is a main core of the host 10, and used for executing many important commands. In the past, the data exchanging of between the data storage device 13 and other data storage device 13 is performed by the host-side control unit 111. For example, the data storage device 13 transmits the data to be exchanged to the host-side control unit 111 via the high-speed channel 12, and then the host-side control unit 111 transmits the data to be exchanged of the data storage device 13 to the other data storage device 13 via the other high-speed channel 12. Accordingly, when the host-side control unit 111 executes important commands, the host-side control unit 111 must still execute the data exchanging between many data storage devices 13 at the same time, thereby the operational burden of the host-side control unit 111 will be increased, and further the operation performance of the host 10 will be affected.

SUMMARY

It is one objective of the present invention to provide a data storage system having dual channels, in which the data storage system comprises a host, the host comprises a host-side control unit, a first data storage device, and at least one second data storage device. The host-side control unit accesses data stored in the first data storage device via a high-speed channel. The exchanging, the copying, or the moving of data between the first data storage devices and the second data storage device can be executed via a low-speed channel. Thus, the first data storage device can exchange, copy or move data with the second data storage device via the low-speed channel without the assistance of the host-side control unit and the high-speed channel, in such a way that the operational burden of the host-side control unit will be decreased.

It is another objective of the present invention to provide a data storage system having dual channels, in which the data storage system comprises a first host and at least one second host, the first host comprises a first host-side control unit and a first data storage device, the first host comprises a first host-side control unit and a first data storage device, the first host-side control unit is connected to the first data storage device via a first high-speed channel, the second host comprises a second host-side control unit and a second data storage device, the second host-side control unit is connected to the second data storage device via a second high-speed channel, the first data storage device of the first host is connected to the second data storage device of the second host via a low-speed channel. The first host is a main host for executing a specific operation, and the second host is a backup host for executing the specific operation. The first host-side control unit of the first host generates at least one operation data and parameter during the execution of the specific operation, and exchanges or copies the operation data and parameter to the second data storage device. If the second host-side control unit of the second host monitors that the first host has crashed, the second host-side control unit of the second host starts a backup action to replace the first host-side control unit of the first host to take over the execution of the specific operation, and then the second host-side control unit of the second host executes the specific operation based on the operation data and parameter obtained from the first host.

It is another objective of the present invention to provide a data storage system having dual channels, which comprises a host. The host comprises a motherboard and a data storage device. The motherboard comprises a first host-side control unit and a second host-side control unit. The data storage device comprises a data-side controller and a plurality of data storage units. A data transmission of high-speed data rate is executed between the first host-side control unit and the data storage device via a high-speed channel, and a data transmission of low-speed data rate is executed between the second host-side control unit and the data storage device via a low-speed channel. Thus, the host of the data storage system can transmit data of two transfer protocols by the means of dual channels and full-duplex to improve the efficiency of data transmission of the host.

To achieve the above objective, the present invention provides a data storage system having dual channels, which comprises a host, the host comprising: a host-side control unit; a first data storage device, comprising a first data-side controller, wherein the host-side control unit is connected to the first data storage device via a high-speed channel, and accesses data stored in the first data storage device via the high-speed channel; and at least one second data storage device, wherein the first data storage device is connected to the second data storage device via a low-speed channel; wherein, the low-speed channel is a bus of broadcast type, the first data-side controller of the first data storage device manages data exchanging, data copying, or data moving between the first data storage device and the second data storage device via the low-speed channel.

In one embodiment of the present invention, wherein the second data storage device is a data storage device for expanding a storage space of the host; when a storable space of the first data storage device is lower than a predetermined threshold, the first data-side controller of the first data storage device moves partial data stored in the first data storage device to the second data storage device.

In one embodiment of the present invention, wherein the first data-side controller of the first data storage device copies data stored in the first data storage device to the second data storage device via the low-speed channel.

In one embodiment of the present invention, wherein the first data storage device and the second data storage device comprises a plurality of data blocks, respectively; when the first data-side controller of the first data storage device executes a garbage collection program or a wear leveling program to the data blocks of the first data storage device and the second data storage device, the moving of data between the data blocks of the first data storage device and the data blocks of the second data storage device will be executed by the first data-side controller of the first data storage device.

In one embodiment of the present invention, wherein the high-speed channel is SATA bus or PCIe bus, and the low-speed channel is CAN bus, serial bus, or other bus with broadcast characteristics.

The present invention further provides a data storage system having dual channels, which comprises a host, the host comprising: a host-side control unit; a microcontroller; a first data storage device, wherein the host-side control unit is connected to the first data storage device via a high-speed channel, and accesses data stored in the first data storage device via the high-speed channel; and at least one second data storage device, wherein the microcontroller is connected to the first data storage device and the second data storage device via a low-speed channel; wherein, the low-speed channel is a bus of broadcast type, the microcontroller manages data exchanging, data copying, or data moving between the first data storage device and the second data storage device via the low-speed channel.

In one embodiment of the present invention, the microcontroller is configured in the host-side control unit.

In one embodiment of the present invention, the first data storage device is a built-in data storage device, and the second data storage device is a built-in data storage device or an external data storage device.

The present invention further provides a data storage system having dual channels, comprising: a first host, comprising a first host-side control unit and a first data storage device, the first data storage device comprising a first data-side controller, wherein the first host-side control unit is connected to the first data storage device via a first high-speed channel, and accesses data stored in the first data storage device via the first high-speed channel; and at least one second host, comprising a second host-side control unit and a second data storage device, the second data storage device comprising a second data-side controller, wherein the second host-side control unit is connected to the second data storage device via a second high-speed channel, and accesses data stored in the second data storage device via the second high-speed channel; wherein, the first data storage device of the first host is connected to the second data storage device of the second host via a low-speed channel, the low-speed channel is a bus of broadcast type; the first data-side controller of the first data storage device or the second data-side controller of the second data storage device is used to execute data exchanging or data copying between the first data storage device and the second storage device.

In one embodiment of the present invention, the data storage system is used to execute a specific operation, the first host is a main host for executing the specific operation, the second host is a backup host for executing the specific operation; the first host-side control unit of the first host generates at least one operation data and parameter and writes the operation data and parameter into the first data storage device via the first high-speed channel during the execution of the specific operation, the first data-side controller of the first data storage device exchanges or copies the operation data and parameter to the second data storage device via the low-speed channel; afterwards, when the second host-side control unit of the second host monitors that the first host has crashed, the second host-side control unit of the second host starts a backup action to replace the first host-side control unit of the first host to take over the execution of the specific operation, and the second host-side control unit of the second host executes the specific operation based on the operation data and parameter obtained from the first host previously.

In one embodiment of the present invention, the specific operation is an operation for network service, software computation, and hardware controlling.

The present invention further provides a data storage system having dual channels, comprising: a first host, comprising a first host-side control unit and a first data storage device, the first data storage device comprising a first data-side controller, wherein the first host-side control unit is connected to the first data storage device via a first high-speed channel, and accesses data stored in the first data storage device via the first high-speed channel; and at least one second host, comprising a second host-side control unit and a second data storage device, the second data storage device comprising a second data-side controller, wherein the second host-side control unit is connected to the second data storage device via a second high-speed channel, and accesses data stored in the second data storage device via the second high-speed channel; and an external control device, comprising a microcontroller; wherein the microcontroller is connected to the first data storage device of the first host and the second data storage device of the second host via a low-speed channel, which is a bus of broadcast type; the microcontroller is able to execute an exchanging of data or a copying of data between the first data storage device and the second storage device.

DETAILED DESCRIPTION OF THE PREFERRED EMBODIMENTS

Figure 1:
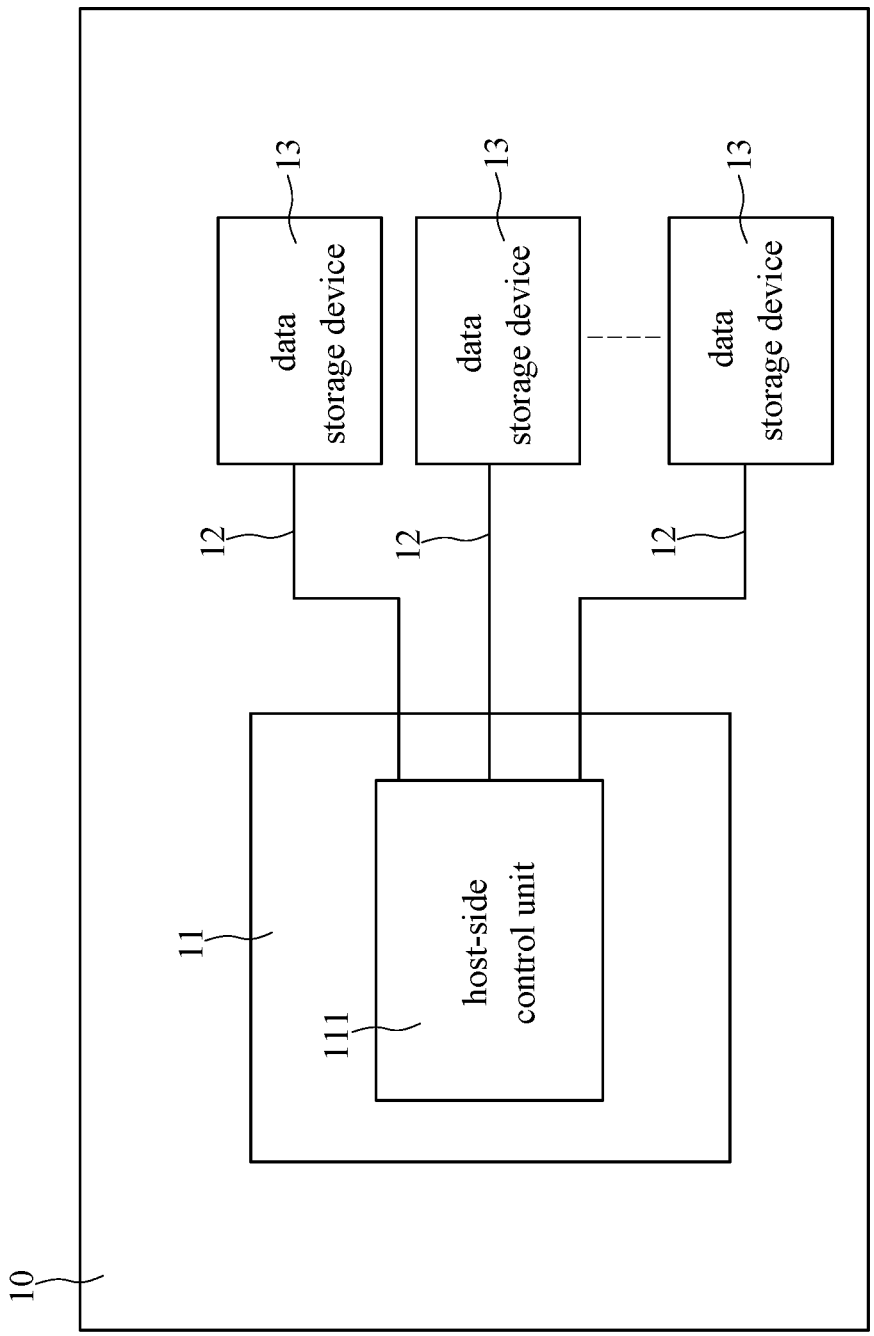
FIG. 1 is an architecture diagram of a data storage system in prior art.
Figure 2:
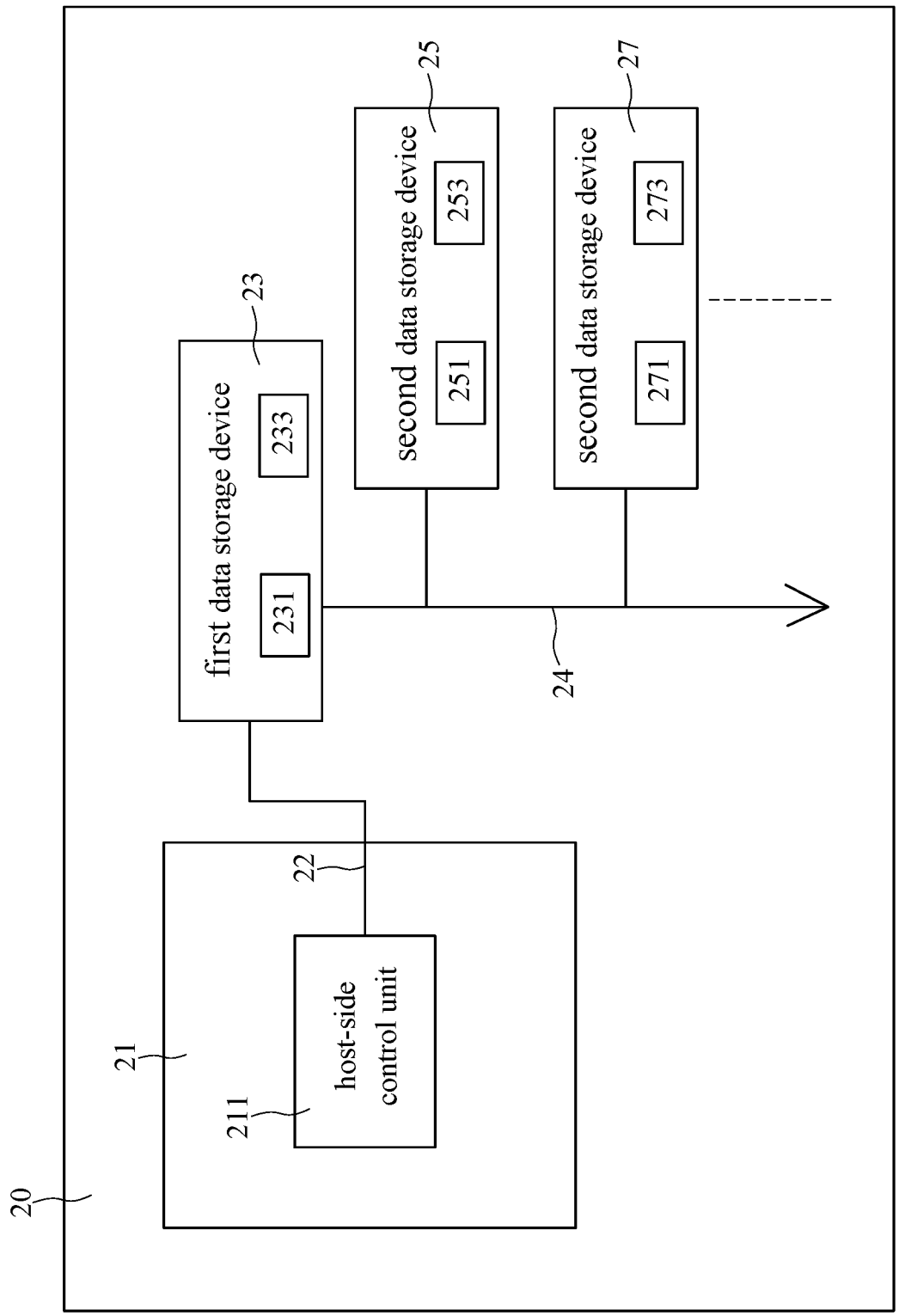
FIG. 2 is an architecture diagram of a data storage system having dual channels according to one embodiment of the present invention.

Referring to FIG. 2, there is shown an architecture diagram of a data storage system having dual channels according to one embodiment of the present invention. As shown in FIG. 2, the data storage system 200 comprises a host 20. The host 20 comprises a motherboard 21, a first data storage device 23, and one or more second data storage devices 25, 27. A host-side control unit 211 is configured on the motherboard 21. The host-side control unit 211 is a central processing unit (CPU), a SATA controller, a PCIe controller, or other controller capable of processing high rate data. The first data storage device 23 comprises a first data-side controller 231 and a plurality of first data storage units 233. The first data-side controller 231 is connected to the first data storage units 233. The second data storage device 25/27 comprises a second data-side controller 251/271 and a plurality of second data storage units 253/273. In one embodiment of the present invention, the first data storage device 23 or the second data storage device 25/27 may be a solid-state disk (SSD) or a memory card, such as CF card, SD card, or the like. The first data storage units 233 and the second data storage units 253/273 may be flash memories.

Besides, the host-side control unit 211 is connected to the first data storage device 23 via a high-speed channel 22. In the present invention, the high-speed channel 22 is a SATA bus, a PCIe bus, or other bus conforming to high-speed transfer protocol. The first data storage device 23 is connected to the second data storage devices 25, 27 via a low-speed channel 24. In the present invention, the low-speed channel 24 transmits data in a broadcast form. The low-speed channel 24 is a controller area network (CAN) bus, a serial bus, or other bus with broadcast characteristics. The host-side control unit 211 accesses data for the first data storage units 233 of the first data storage device 23 via the high-speed channel 22. Data exchanging, data copying, or data moving between the first data storage device 23 and the second data storage devices 25, 27 can be executed via the low-speed channel 24.

In one embodiment of the present invention, the first data storage device 23 is a system hard disk of the host 20 and installed with an operating system, and the second data storage devices 25, 27 are extended hard disks of the host 20. When the first data-side controller 231 of the first data storage device 23 monitors that the storable space of the first data storage units 233 is lower than a predetermined threshold, the first data-side controller 231 moves partial data stored in the first data storage units 233 of the first data storage device 23 to the second data storage units 253/273 of the second data storage device 25/27 via the low-speed channel 24 so that the storable space of the first data storage units 233 can be increased, and therefore are higher than the predetermined threshold. Thus, the first data-side controller 231 of the first data storage device 23 can manage the storable space of the first data storage units 233 so that the system data generated by the operating system during the operation can be smoothly written into the first data storage units 233 having enough storable space.

In another embodiment of the present invention, the first data storage device 23 is a main hard disk of the host 20, and the second data storage devices 25, 27 are mirror hard disks. When the first data storage device 23 receives the data transmitted from the host-side control unit 211, the first data-side controller 231 of the first data storage device 23 writes the data transmitted from the host-side control unit 211 to the first data storage units 233, and then backs up the data transmitted from the host-side control unit 211 to the second data storage units 253, 273 of the second data storage devices 25, 27 via the low-speed channel 24. Thus, the first data storage device 23 and the second data storage devices 25, 27 will be written the same data. Afterwards, the important data can still be obtained from the mirror hard disks 25, 27 when the main hard disk 23 has damaged.

Besides, the first data storage units 233 of the first data storage device 23 and the second data storage units 253, 273 of the second data storage devices 25, 27 comprises a plurality of data blocks, respectively. In another embodiment of the present invention, the first data-side controller 231 of the first data storage device 23 executes a garbage collection program or a wear leveling program for the data blocks of the first data storage units 233 and the second data storage units 253, 273 so as to move data between the data blocks of the first data storage units 233 and the data blocks of the second data storage units 253, 273. By the execution of the garbage collection program and the wear leveling program, the efficiency of data access of the first data storage device 23 and the second data storage devices 25, 27 will be increased, and the probability of damage of partial specific data blocks in the first data storage device 23 and the second data storage devices 25, 27 will be decreased.

In the present invention, the first data storage device 23 can exchange, copy or move data with the second data storage devices 25, 27 via the low-speed channel 24 without the assistance of the host-side control unit 211 and the high-speed channel 22, in such a way that the operational burden of the host-side control unit 211 will be decreased.

Figure 3:
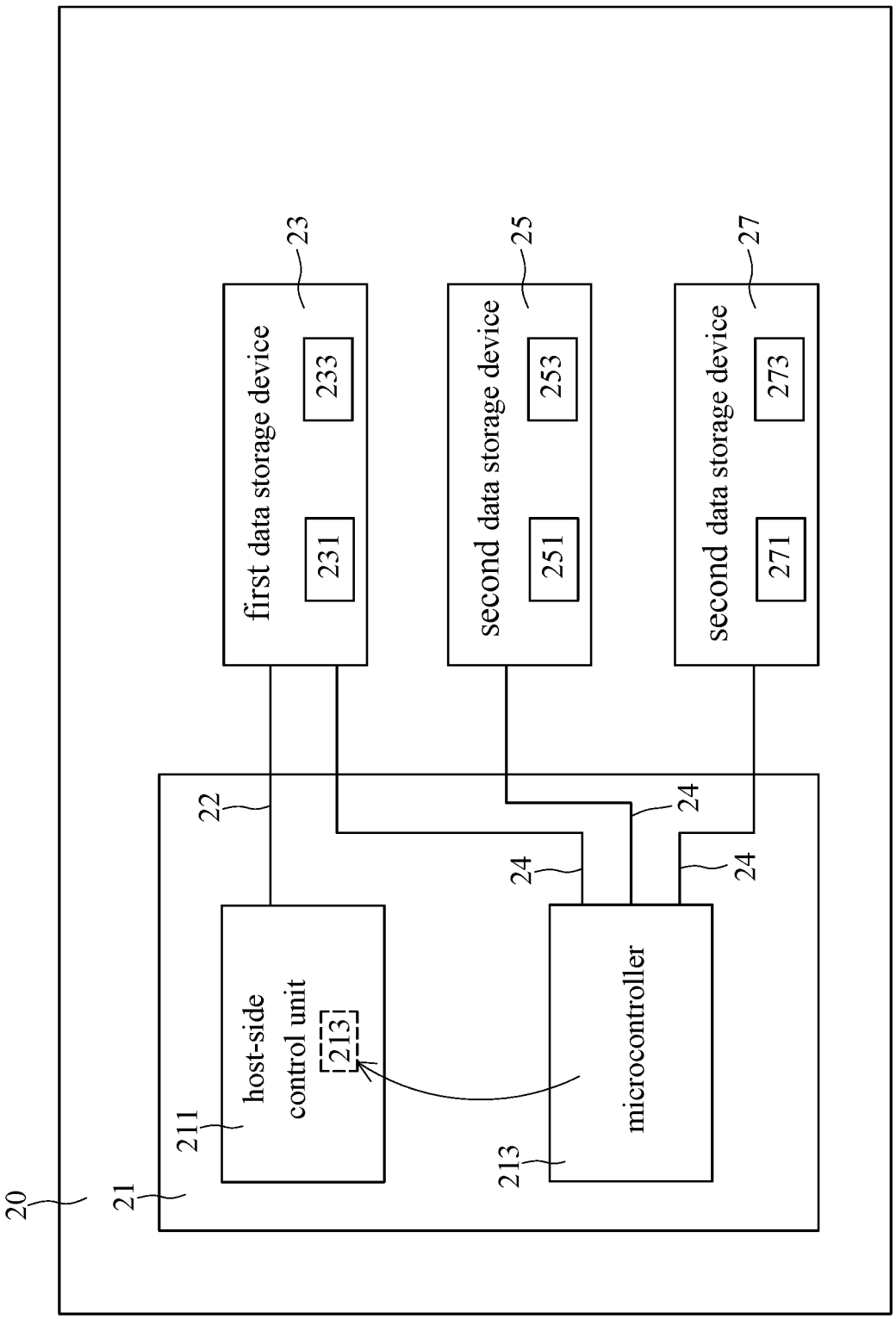
FIG. 3 is an architecture diagram of a data storage system having dual channels according to another embodiment of the present invention.

Referring to FIG. 3, there is shown an architecture diagram of a data storage system having dual channels according to another embodiment of the present invention. As shown in FIG. 3, the motherboard 21 of the host 20 of the data storage system 201 is provided with a microcontroller 213 thereon. The microcontroller 213 is connected to the first data storage devices 23 and the second data storage devices 25, 27 via the low-speed channel 24, respectively.

In the data storage system 200 of the above embodiment of FIG. 2, the exchanging, the copying, or the moving of data between the first data storage devices 23 and the second data storage devices 25, 27 can be managed by the first data-side controller 231 of the first data storage device 23 via the low-speed channel 24; in the data storage system 201 of the embodiment of FIG. 3, comparatively, the exchanging, the copying, or the moving of data between the first data storage devices 23 and the second data storage devices 25, 27 can be managed by the microcontroller 213 configured on the motherboard 20 via the low-speed channel 24. Accordingly, the microcontroller 213 moves partial data stored in the first data storage units 233 of the first data storage device 23 to the second data storage units 253/273 of the second data storage device 25/27 via the low-speed channel 24 when the microcontroller 213 monitors that the storable space of the first data storage unit 233 is lower than a predetermined threshold. Or, the data stored in the first data storage device 23 can be completely copied to the second data storage devices 25, 27 by the microcontroller 213 via the low-speed channel 24 so that the important data can be read from the second data storage device 25/27 when the first data storage device 23 has damaged. Or, the microcontroller 213 can executes a garbage collection program or a wear leveling program for the data blocks of the first data storage units 233 and the second data storage units 253, 273 so as to move data between the data blocks of the first data storage units 233 and the data blocks of the data storage units 253, 273. Thus, the exchanging, the copying, or the moving of data between the first data storage devices 23 and the second data storage devices 25, 27 can be managed by the microcontroller 213 via the low-speed channel 24 so as to decrease the operational burden of the host-side control unit 211 of the host 20.

In one embodiment of the present invention, the host-side control unit 211 and the microcontroller 213 are configured on the motherboard 21, respectively. In another embodiment of the present invention, the microcontroller 213 is configured in the host-side control unit 211, the microcontroller 213 and the host-side control unit 211 can be integrated as a single chip. In the present embodiment, the first data storage device 23 is a built-in data storage device, and the second data storage devices 25, 27 are built-in data storage devices or external data storage devices.

Figure 4:
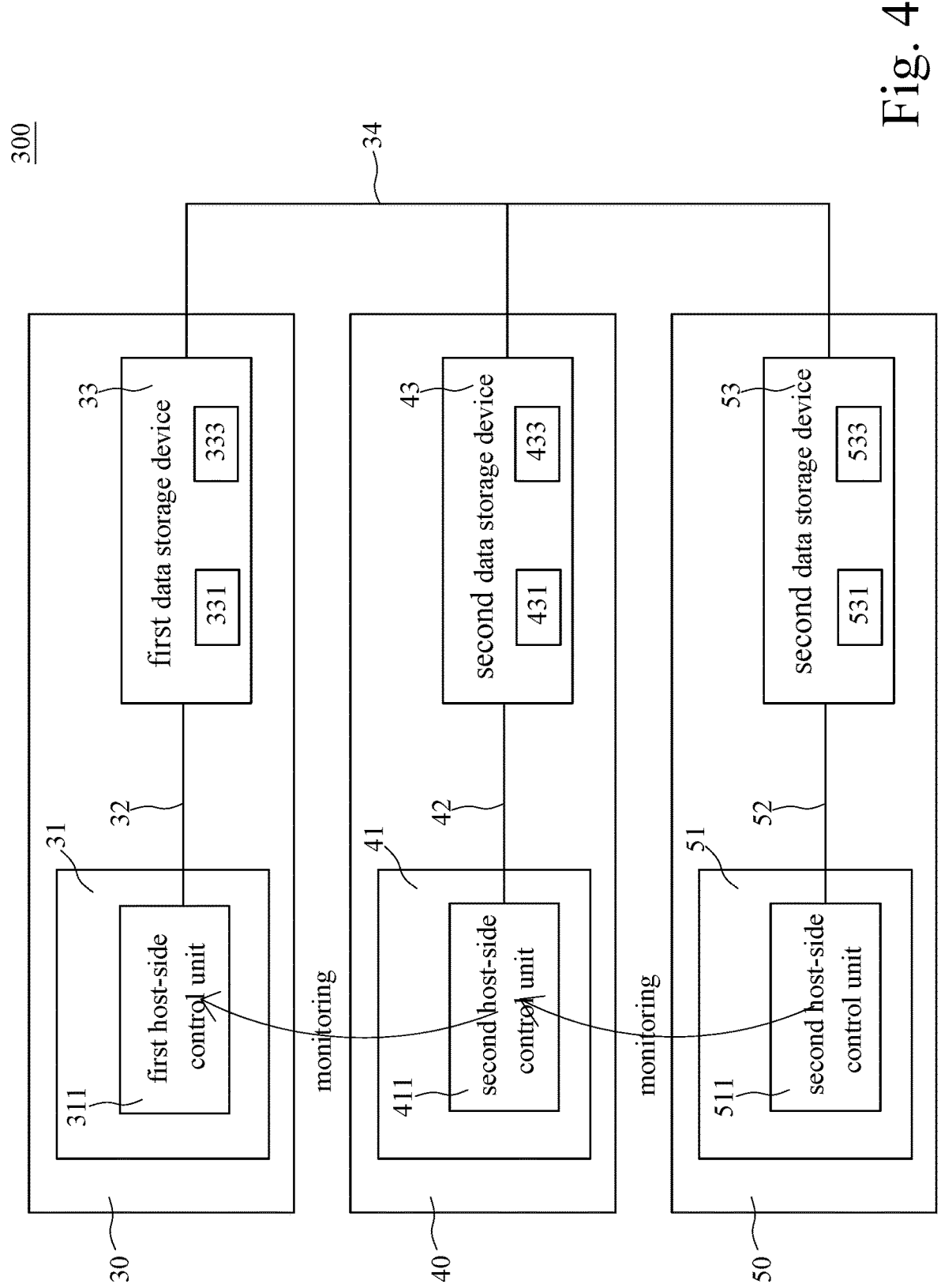
FIG. 4 is an architecture diagram of a data storage system having dual channels according to another embodiment of the present invention.

Referring to FIG. 4, there is shown an architecture diagram of a data storage system having dual channels according to another embodiment of the present invention. As shown in FIG. 4, the data storage system 300 comprises a first host 30 and one or more second hosts 40, 50. The first host 30 comprises a first motherboard 31 and a first data storage device 33. The first motherboard 31 is provided with a first host-side control unit 311 thereon. The first data storage device 33 comprises a first data-side controller 331 and a plurality of first data storage units 333. The first data-side controller 331 is connected to the first data storage units 333. The second host 40/50 comprises a second motherboard 41/51 and a second data storage device 43/53. The second motherboard 41/51 is provided with a second host-side control unit 411/511 thereon. The second data storage device 43/53 comprises a second data-side controller 431/531 and a plurality of second data storage units 433/533. The second data-side controller 431/531 is connected to the second data storage units 433/533.

The first host-side control unit 311 is connected to the first data storage device 33 via a first high-speed channel 32, and accesses the data stored in the first data storage device 33 via the first high-speed channel 32. The second host-side control unit 411/511 is connected to the second data storage device 43/53 via a second high-speed channel 42/52, and accesses the data stored in the second data storage device 43/53 via the second high-speed channel 42/52. The first data storage device 33 of the first host 30 and the second data storage device 43/53 of the second host 40/50 are connected together via a low-speed channel 34. The first data-side controller 331 of the first data storage device 33 and the second data-side controllers 431, 531 of the second data storage devices 43, 53 can exchange or copy data stored in the first data storage units 333 and the second data storage units 433, 533 each other. The first high-speed channel 32 and the second high-speed channels 42, 52 are SATA buses, PCI-e buses, or other buses conforming to high-speed transfer protocol. The low-speed channel 34 is a CAN bus, a serial bus, or other bus with broadcast characteristics, and transmits data in a broadcast form.

The data storage system 300 of the embodiment is able to execute a specific operation. The first host 30 is a main host for executing the specific operation, the second host 40 is a backup host for executing the specific operation. The first host-side control unit 311 of the first host 30 can generate at least one operation data and parameter and write the operation data and parameter into the first data storage units 333 via the first high-speed channel 32 during the execution of the specific operation. Afterwards, the first data-side controller 331 of the first data storage device 33 copies the operation data and parameter to the second data storage device 43. The second data-side controller 431 of the second data storage device 43 receives the operation data and parameter from the first data storage device 33, and writes the operation data and parameter into the second data storage units 433.

The second host-side control unit 411 of the second host 40 can monitor the operation of the first host 30 when the first host-side control unit 311 of the first host 30 executes the specific operation. If the second host-side control unit 411 of the second host 40 monitors that the first host 30 has crashed or damaged, the second host-side control unit 411 of the second host 40 starts a backup action to replace the first host-side control unit 311 of the first host 30 to take over the execution of the specific operation, and then the second host-side control unit 411 of the second host 40 executes the specific operation based on the operation data and parameter obtained from the first host 30 previously. Similarly, the second host-side control unit 511 of the other second host 50 also monitors the operation of the second host 40; afterwards, the second host-side control unit 511 of the other second host 50 will support the execution of the specific operation if the second host-side control unit 511 of the other second host 50 monitors that the second host 40 has crashed.

Taking an example, the data storage system 300 of the present invention can be a platform system for providing a network service. The first host 30 is a main host for executing the network service, and the second hosts 40, 50 are backup hosts for executing the network service. When the first data-side control unit 311 of the first host 30 executes the network service, it will generate the operation data and parameter related with the network service, and write the operation data and parameter related with the network service into the first data storage units 333 of the first data storage device 33. Furthermore, the first data-side controller 331 of the first data storage device 33 copies the operation data and parameter related with the network service to the second data storage devices 43, 53. The second data-side controllers 431, 531 of the second data storage devices 40, 50 writes the operation data and parameter, received from the first data storage device 33, related with the network service, into the second data storage units 433, 533. The second host-side control unit 411/511 of the second host 40/50 will monitor the operation of the first host 30 when the first host-side control unit 311 of the first host 30 executes the network service. If the second host-side control unit 411/511 of the second host 40/50 monitors that the first host 30 has crashed, the second host-side control unit 411/511 will start the backup action to replace the first host-side control unit 311 of the first host 30 to take over the execution of the network service, and executes the network service based on the operation data and parameter obtained from the first host 30.

Accordingly, the operation data and parameter required by the execution of the specific operation can be exchanged or copied between the first host 30 and the second hosts 40, 50 via the low-speed channel 34, so the second host 40/50 can take over the execution of the specific operation based on the operation data and parameter obtained from the first host 30 when the first host 30 has crashed. As the above described, the data storage system 300 having dual channels is applied to an operation of network service, which is only a specific embodiment of the present invention, it can also be applied to an operation of software computation, hardware controlling, or other application, herein, the description no longer to proceed, again.

Figure 5:
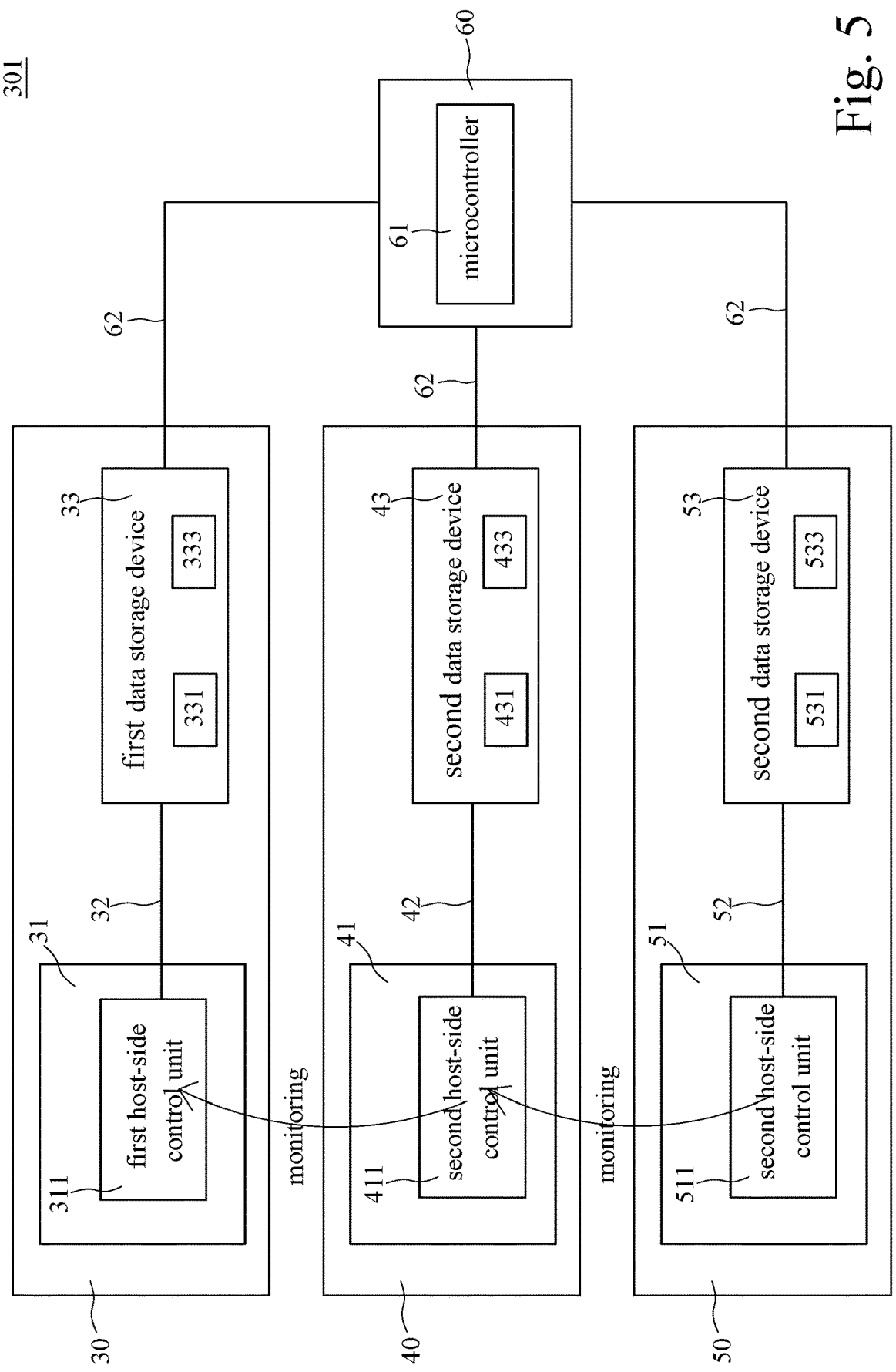
FIG. 5 is an architecture diagram of a data storage system having dual channels according to another embodiment of the present invention.

Referring to FIG. 5, there is shown an architecture diagram of a data storage system having dual channels according to another embodiment of the present invention. Compared to the data storage system 300 in FIG. 4, the data storage system 301 in FIG. 5 further comprises an external control device 60. The external control device 60 comprises a microcontroller 61. The external control device 60 is connected to the first data storage device 33 of the first host 30 and the second data storage devices 43, 53 of the second hosts 40, 50 via a low-speed channel 62, respectively. The low-speed channel 62 is a CAN bus, a serial bus, or other bus with broadcast characteristics.

In the data storage system 300 of the embodiment of FIG. 4, the exchanging or the copying of data between the first data storage device 33 and the second data storage devices 43, 53 is able to be managed by the first data-side controller 331 of the first data storage device 33 or the second data-side controller 431/531 of the second data storage device 43/53 via the low-speed channel 34. In the data storage system 301 of the embodiment of FIG. 5, on the contrary, the exchanging or the copying of data between the first data storage device 33 and the second data storage devices 43, 53 is able to be managed by the microcontroller 61 of the external control device 60 via the low-speed channel 62.

Similarly, the data storage system 301 of the embodiment can also execute the specific operation. The first host 30 is the main host for executing the specific operation, and the second hosts 40, 50 are the backup hosts for executing the specific operation. The first host-side control unit 311 of the first host 30 will generate the operation data and parameter and write the operation data and parameter into the first data storage units 333 of the first data storage device 33 via the first high-speed channel 32 during the execution of the specific operation. Afterwards, the microcontroller 61 reads the operation data and parameter from the first data storage device 33 via the low-speed channel 62, and transmits the operation data and parameter to the second data storage devices 43, 53. The second data-side controller 431, 531 of the second data storage devices 43, 53 receives the operation data and parameter from the microcontroller 61, and writes the operation data and parameter into the second data storage units 433, 533.

The second host-side control unit 411/511 of the second host 40/50 will monitor the operation of the first host 30 when the first host-side control unit 311 of the first host 30 executes the specific operation. If the second host-side control unit 411/511 of the second host 40/50 monitors that the first host 30 has crashed, the second host-side control unit 411/511 will start the backup action to replace the first host-side control unit 311 of the first host 30 to take over the execution of the specific operation, and executes the specific operation based on the operation data and parameter obtained from the first host 30.

Accordingly, the operation data and parameter required by the execution of the specific operation can be exchanged or copied between the first host 33 and the second hosts 40, 50 by the microprocessor 61 via the low-speed channel 34, so that the second host 40/50 takes over the execution of the specific operation based on the operation data and parameter obtained from the first host 30 when the first host 30 has crashed.

Figure 6:
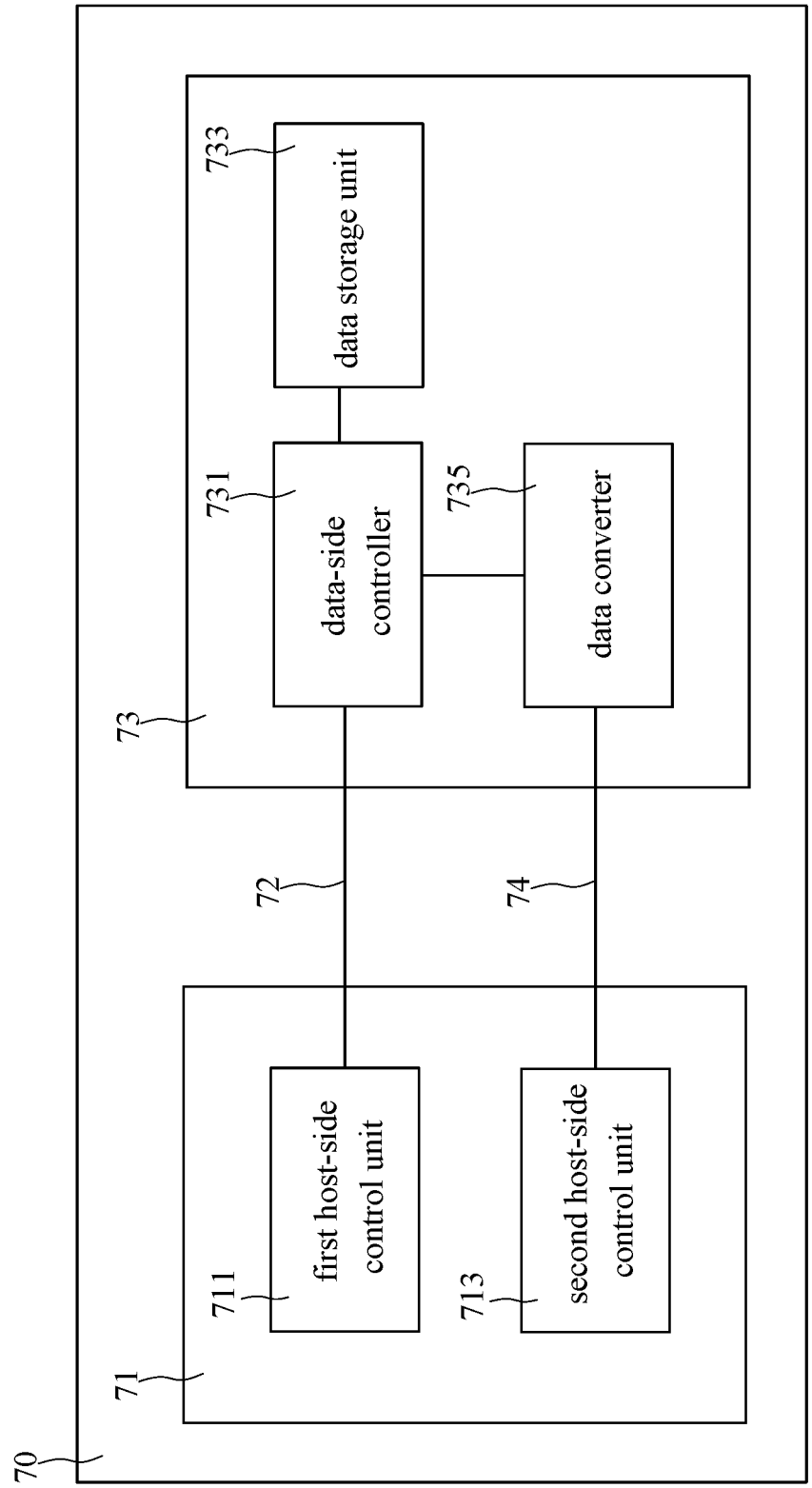
FIG. 6 is an architecture diagram of a data storage system having dual channels according to another embodiment of the present invention.

Referring to FIG. 6, there is shown an architecture diagram of a data storage system having dual channels according to another embodiment of the present invention. As shown in FIG. 6, the data storage system 700 comprises a host 70. The host 70 comprises a motherboard 71 and a data storage device 73. The motherboard 71 is provided with a first host-side control unit 711 and a second host-side control unit 713. The data storage device 73 comprises a data-side controller 731 and a plurality of data storage units 733. The data-side controller 731 is connected to the data storage units 733. The first host-side control unit 711 is connected to the data-side controller 731 of the data storage device 73 via a high-speed channel 72, and the second host-side control unit 713 is connected to the data-side controller 731 of the data storage device 73 via a low-speed channel 74. The first host-side control unit 711 is a central processing unit (CPU), a SATA controller, a PCIe controller, or other controller capable of processing high rate data. The second host-side control unit 713 is a controller for processing low rate data. The high-speed channel 72 is a SATA bus, a PCIe bus, or other bus conforming to high-speed transfer protocol, and the low-speed channel 74 is a CAN bus, a serial bus, or other bus with broadcast characteristics.

In the present embodiment, a high data rate (HDR) data can be transmitted between the first host-side control unit 711 and the data-side controller 731 of the data storage device 73 via the high-speed channel 72, for example, a video recording data can be transmitted between the first host-side control unit 711 and the data-side controller 731 of the data storage device 73 via the high-speed channel 72, and a low data rate (LDR) data can be transmitted between the second host-side control unit 713 and the data storage device 73 via the low-speed channel 74, for example, some detected parameters (such as system temperature, voltage, or current of the data storage device 73) or control signals can be transmitted between the second host-side control unit 713 and the data storage device 73 via the low-speed channel 74.

The data storage device 73 further comprises a data converter 735 provided between the low-speed channel 74 and the data-side controller 731. The data converter 735 is used to execute a conversion of transfer protocol for data transmitted on the low speed channel 74, for example, the data transmitted on the low speed channel 74 is converted from a low-speed transfer protocol (such as CAN or USB transfer protocol) into a high-speed transfer protocol (such as SATA or PCIe transfer protocol) by the data converter 735 or converted from the high-speed transfer protocol into the low-speed transfer protocol by the data converter 735.

Accordingly, the data storage system 700 of the present embodiment can transmit data of two transfer protocols by the means of dual channels and full-duplex to improve the efficiency of data transmission of the host 70.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:
1. A data storage system having dual channels, which comprises a host, the host comprising:
a host-side control unit;
a first data storage device, comprising a first data-side controller, wherein the host-side control unit is connected to the first data storage device via a high-speed channel, and accesses data stored in the first data storage device via the high-speed channel; and
at least one second data storage device, wherein the first data storage device is connected to the second data storage device via a low-speed channel;
wherein, the low-speed channel is a bus of broadcast type, the first data-side controller of the first data storage device manages data exchanging, data copying, or data moving between the first data storage device and the second data storage device via the low-speed channel; wherein the second data storage device is a data storage device for expanding a storage space of the host; when a storable space of the first data storage device is lower than a predetermined threshold, the first data-side con- troller of the first data storage device moves partial data stored in the first data storage device to the second data storage device.

2. The data storage system having dual channels according to claim 1, wherein the first data-side controller of the first data storage device copies data stored in the first data storage device to the second data storage device via the low-speed channel.

3. The data storage system having dual channels according to claim 1, wherein the high-speed channel is SATA bus or PCIe bus, and the low-speed channel is CAN bus, serial bus, or other bus with broadcast characteristics.

4. A data storage system having dual channels, which comprises a host, the host comprising:
a host-side control unit;
a first data storage device, comprising a first data-side controller, wherein the host-side control unit is connected to the first data storage device via a high-speed channel, and accesses data stored in the first data storage device via the high-speed channel; and
at least one second data storage device, wherein the first data storage device is connected to the second data storage device via a low-speed channel;
wherein, the low-speed channel is a bus of broadcast type, the first data-side controller of the first data storage device manages data exchanging, data copying, or data moving between the first data storage device and the second data storage device via the low-speed channel;
wherein the first data storage device and the second data storage device comprises a plurality of data blocks, respectively; when the first data-side controller of the first data storage device executes a garbage collection program or a wear leveling program to the data blocks of the first data storage device and the second data storage device, the moving of data between the data blocks of the first data storage device and the data blocks of the second data storage device will be executed by the first data-side controller of the first data storage device.

5. A data storage system having dual channels, which comprises a host, the host comprising:
a host-side control unit;
a microcontroller;
a first data storage device, wherein the host-side control unit is connected to the first data storage device via a high-speed channel, and accesses data stored in the first data storage device via the high-speed channel; and
at least one second data storage device, wherein the microcontroller is connected to the first data storage device and the second data storage device via a low-speed channel;
wherein, the low-speed channel is a bus of broadcast type, the microcontroller manages data exchanging, data copying, or data moving between the first data storage device and the second data storage device via the low-speed channel;
wherein the second data storage device is a data storage device for expanding a storage space of the host; when the microcontroller monitors that a storable space of the first data storage device is lower than a predetermined threshold, partial data stored in the first data storage device will be moved to the second data storage device by the microcontroller via the low-speed channel.

6. The data storage system having dual channels according to claim 5, wherein the microcontroller copies data stored in the first data storage device to the second data storage device via the low-speed channel.

7. The data storage system having dual channels according to claim 5, wherein the high-speed channel is SATA bus or PCIe bus, and the low-speed channel is CAN bus, serial bus, or other bus with broadcast characteristics.

8. The data storage system having dual channels according to claim 5, wherein the microcontroller is configured in the host-side control unit.

9. The data storage system having dual channels according to claim 5, wherein the first data storage device is a built-in data storage device, and the second data storage device is a built-in data storage device or an external data storage device.

10. A data storage system having dual channels, which comprises a host, the host comprising:
a host-side control unit;
a microcontroller;
a first data storage device, wherein the host-side control unit is connected to the first data storage device via a high-speed channel, and accesses data stored in the first data storage device via the high-speed channel; and
at least one second data storage device, wherein the microcontroller is connected to the first data storage device and the second data storage device via a low-speed channel;
wherein, the low-speed channel is a bus of broadcast type, the microcontroller manages data exchanging, data copying, or data moving between the first data storage device and the second data storage device via the low-speed channel;
wherein the first data storage device and the second data storage device comprises a plurality of data blocks, respectively; when the microcontroller executes a garbage collection program or a wear leveling program to the data blocks of the first data storage device and the second data storage device, the moving of data between the data blocks of the first data storage device and the data blocks of the second data storage device will be executed by the microcontroller.

11. A data storage system having dual channels, comprising:
a first host, comprising a first host-side control unit and a first data storage device, the first data storage device comprising a first data-side controller, wherein the first host-side control unit is connected to the first data storage device via a first high-speed channel, and accesses data stored in the first data storage device via the first high-speed channel; and
at least one second host, comprising a second host-side control unit and a second data storage device, the second data storage device comprising a second data-side controller, wherein the second host-side control unit is connected to the second data storage device via a second high-speed channel, and accesses data stored in the second data storage device via the second high-speed channel;
wherein, the first data storage device of the first host is connected to the second data storage device of the second host via a low-speed channel, the low-speed channel is a bus of broadcast type; the first data-side controller of the first data storage device or the second data-side controller of the second data storage device is used to execute data exchanging or data copying between the first data storage device and the second storage device;
wherein the data storage system is used to execute a specific operation, the first host is a main host for executing the specific operation, the second host is a backup host for executing the specific operation; the first host-side control unit of the first host generates at least one operation data and parameter and writes the operation data and parameter into the first data storage device via the first high-speed channel during the execution of the specific operation, the first data-side controller of the first data storage device exchanges or copies the operation data and parameter to the second data storage device via the low-speed channel; afterwards, when the second host-side control unit of the second host monitors that the first host has crashed, the second host-side control unit of the second host starts a backup action to replace the first host-side control unit of the first host to take over the execution of the specific operation, and the second host-side control unit of the second host executes the specific operation based on the operation data and parameter obtained from the first host previously.

12. The data storage system having dual channels according to claim 11, wherein the specific operation is an operation for network service, software computation, and hardware controlling.

13. The data storage system having dual channels according to claim 11, wherein the first high-speed channel or the second high-speed channel is SATA bus or PCIe bus, and the low-speed channel is CAN bus, serial bus, or other bus with broadcast characteristics.

14. A data storage system having dual channels, comprising:
   a first host, comprising a first host-side control unit and a first data storage device, the first data storage device comprising a first data-side controller, wherein the first host-side control unit is connected to the first data storage device via a first high-speed channel, and accesses data stored in the first data storage device via the first high-speed channel; and
   at least one second host, comprising a second host-side control unit and a second data storage device, the second data storage device comprising a second data-side controller, wherein the second host-side control unit is connected to the second data storage device via a second high-speed channel, and accesses data stored in the second data storage device via the second high-speed channel; and
   an external control device, comprising a microcontroller;
   wherein the microcontroller is connected to the first data storage device of the first host and the second data storage device of the second host via a low-speed channel, which is a bus of broadcast type; the microcontroller is able to execute an exchanging of data or a copying of data between the first data storage device and the second storage device;
   wherein the data storage system is used to execute a specific operation, the first host is a main host for executing the specific operation, the second host is a backup host for executing the specific operation; the first host-side control unit of the first host generates at least one operation data and parameter and writes the operation data and parameter into the first data storage device via the first high-speed channel during the execution of the specific operation, the microcontroller of the external control device exchanges or copies the operation data and parameter to the second data storage device via the low-speed channel; afterwards, when the second host-side control unit of the second host monitors that the first host has crashed, the second host-side control unit of the second host starts a backup action to replace the first host-side control unit of the first host to take over the execution of the specific operation, and the second host-side control unit of the second host executes the specific operation based on the operation data and parameter obtained from the first host previously.

15. The data storage system having dual channels according to claim 14, wherein the specific operation is an operation for network service, software computation, and hardware controlling.

16. The data storage system having dual channels according to claim 14, wherein the first high-speed channel or the second high-speed channel is SATA bus or PCIe bus, and the low-speed channel is CAN bus, serial bus, or other bus with broadcast characteristics.

* * * * *